K. GOLDSCHMIDT & F. SPITZER.
SEPARATING AND CONCENTRATING CHLORIN.
APPLICATION FILED MAY 4, 1908.
934,400.
Patented Sept. 14, 1909.
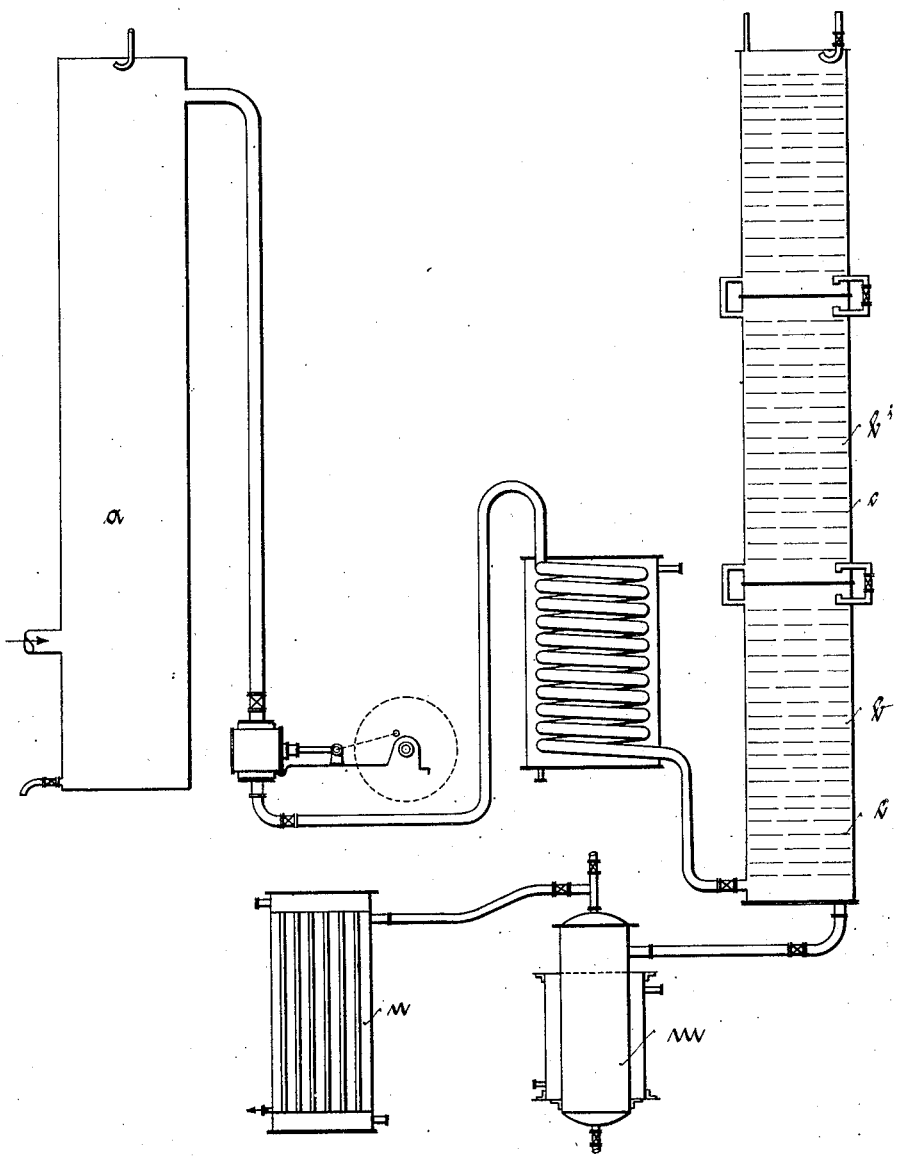

UNITED STATES PATENT OFFICE.

KARL GOLDSCHMIDT AND FRITZ SPITZER, OF ESSEN-ON-THE-RUHR, GERMANY, ASSIGNORS TO TH. GOLDSCHMIDT, OF ESSEN-ON-THE-RUHR, GERMANY, A FIRM.

SEPARATING AND CONCENTRATING CHLORIN.

934,400.

Specification of Letters Patent.   Patented Sept. 14, 1909.

Application filed May 4, 1908. Serial No. 430,876.

*To all whom it may concern:*

Be it known that we, KARL GOLDSCHMIDT, subject of the King of Prussia, German Emperor, and FRITZ SPITZER, subject of the Emperor of Austria, both residents of Essen-on-the-Ruhr, in the Province of the Rhine, German Empire, have jointly invented certain new and useful Improvements in Separating and Concentrating Chlorin, of which the following is an exact specification.

Chlorin produced technically in large quantities is always more or less diluted with other gases, whether the chlorin has been produced by the Weldon or Deacon process, or electrolytically. These dilutions are frequently of great disadvantage, especially if the chlorin is to be liquefied. In such cases it has not been possible heretofore to liquefy the whole of the chlorin, but, on the contrary, the escaping gases have contained a large quantity of chlorin, the lower the content of chlorin of the gas used the greater being the quantity of chlorin not liquefied. Accordingly it is a problem of considerable importance to find means for concentrating the chlorin from such mixtures.

It has been proposed to effect the concentration of chlorin by passing the mixture through organic substances capable of dissolving the chlorin. Such substances however either tended to yield their moisture or their hydrogen for the formation of hydrochloric acid, which attacked the metal vessels employed, or the subsequent heating and diminution of the pressure caused the dissolving agent to be partly converted into gas, which passed off in company with the chlorin and no concentration was effected thereby.

In the process forming the subject-matter of this invention, the dissolving agent employed for the chlorin is a chlorid compound. The chlorin is dissolved by this agent at a low temperature and under pressure, and it is separated from the agent by increasing the temperature and by diminishing the pressure. The agent preferably used is anhydrous stannic chlorid, but chromic oxy dichlorid and sulfur chlorid may also be employed.

Stannic chlorid has a high boiling point (114° C.), a low freezing point (−33° C.) which is still further lowered when chlorin is dissolved in the chlorid, a very low specific heat (0.1402 according to Regnault) and a very low vapor-pressure (at 40° only 50 mm., according to Young, *Phil. Mag.* 34, p. 512, 1892). It is therefore easy to obtain the chlorin in a pure state from a solution of the stannic chlorid by slightly raising the temperature of the solution. Besides, the other gases present carry with them only a very small quantity of this dissolving agent, in consequence of the low vapor-pressure of the stannic chlorid, and these small quantities can easily be recovered, as stannic chlorid has a great affinity for water and readily dissolves in it.

At 0° C. and 1 atmosphere pressure stannic chlorid dissolves 9.4% of its own weight of chlorin. Its dissolving capacity is however smaller if the chlorin introduced is diluted with other gases (Henry and Dalton's law, see Nernst. *Theoretical Chemistry*, 5th edition, 1907, Stuttgart, p. 152). From a mixture of about 40% chlorin by volume and 60% of air only 3.6% of chlorin is dissolved by stannic chlorid at the temperature and pressure stated above.

In order to dissolve larger quantities of chlorin in the same quantity of the dissolving agent and at the same pressure, the dissolving agent must be considerably cooled. Nevertheless only weak solutions of the chlorin can be obtained in the dissolving agent. The disadvantage is all the greater, as the dissolving agent cannot be heated and the pressure diminished to such a degree as to permit the whole of the chlorin to escape. Consequently only part of the dissolved chlorin is obtained in a concentrated state and large quantities of the dissolving agent must be moved, cooled and heated in order to obtain comparatively small quantities of concentrated chlorin.

If a mixture of gas containing a large amount of chlorin is subjected to such a temperature and such a pressure that, according to the law of partial pressures (Dalton, see Nernst, *Theoretical Chemistry*, 5th edition, Stuttgart, 1907, p. 60) chlorin will not be separated, a considerable quantity of chlorin is liquefied as soon as the mixture of gas is introduced into stannic chlorid or one of the other above mentioned dissolving agents. The stannic chlorid in such a case takes up nearly twice its own weight of chlorin. The above mentioned pressure is found, according to the law of partial pressures, in the following way: If $x$ is the percentage of chlorin in the gas in volume and if P is the vapor pressure of the liquid chlorin at the proposed working temperature, then the pressure $p$ theoretically required for the separation of liquid chlorin is found from the relationship $$P:x = p:100, \text{ i. e. } p = 100\frac{P}{x}.$$

If the gas is led through a refrigerator cooled down to the necessary temperature but with a pressure considerably higher (e. g. 1 atmosphere) than the pressure calculated in the way stated above, only a small part will be condensed if the chlorin is much diluted. If, however, the gaseous mixture cooled in the manner described is led into stannic chlorid, the whole of the chlorin will be dissolved if the gases are sufficiently mixed with the stannic chlorid, and a gas escapes which is practically free from chlorin, from which gas traces of stannic chlorid carried away with it may be obtained by washing without difficulty. The liquefaction of the chlorin from this gaseous mixture is explained by the fact that the vapor-pressure of the chlorin in this mixture of stannic chlorid and chlorin is considerably lower than that of the pure liquid chlorin Furthermore, the effect of the stannic chlorid may be explained by assuming that in the gaseous mixture under the conditions above stated the chlorin has partially condensed in the form of tiny drops to a nebula, and that stannic chlorid facilitates the formation of drops from this nebula, i. e. the formation of a cohering liquid. It is very easy to obtain pure chlorin from this mixture of stannic chlorid and chlorin by raising the temperature of the mixture slightly. Pure chlorin escapes and a stannic chlorid is left which retains more or less chlorin according to the degree of heating or of diminishing the pressure, which stannic chlorid may be reintroduced into the process as a dissolving agent. If the chlorin thus produced is to be obtained in a liquid form it has only to be conducted into a cooled receptacle, where, according to Watt's law, it will become liquefied. The cooling temperature depends upon the pressure which, in its turn, depends on the temperature to which the mixture of chlorin and stannic chlorid is heated.

In order to make our process more clear, the following description is given as an example, and an apparatus suitable for carrying it out is diagrammatically illustrated in the accompanying drawing.

From an electrolytic decomposition cell or other source the produced chlorin is at first led through a drying apparatus such as $a$, preferably an absorption tower fed with sulfuric acid, in order to free the chlorin wholly from moisture. The chlorin leaving the tower contains 80 parts by volume of chlorin and 20 parts by volume of air, oxygen and carbon dioxid drawn off from the anode compartment. According to Knietsch, liquid chlorin at $-20°$ C. has a pressure of 1.84 kg. upon 1 sq. cm. According to the above mentioned formula $\left(\text{pressure} = 100\frac{P}{x}\right)$ the gaseous mixture ought to be compressed to 2.30 kg. upon 1 sq. cm. or, calculated approximately in atmospheres, the gaseous mixture has to be compressed to 1.3 atmospheres beyond the ordinary pressure of the air in order to separate the chlorin in a liquid state. With the formation of the first drop, of course, the gaseous mixture will alter and an increasing pressure is necessary as soon as the liquefaction of the chlorin has begun. This gaseous mixture cooled to $-20°$ and compressed to 1.3 atm. above atmospheric pressure is conducted into stannic chlorid contained in a vessel $b$ cooled to the same temperature. The chlorin is dissolved in the stannic chlorid, and the escaping gaseous mixture nearly free from chlorin is led into a second vessel $b'$ filled with stannic chlorid. In order to effect a thorough mixing of the gaseous bubbles with the dissolving agent a number of perforated plates, indicated by the reference letter $c$, are placed horizontally one above the other in the vessels. Further vessels may be inserted, the number depending upon the height of the layer of the dissolving agent and upon the velocity of the streaming gas. A gas perfectly free from chlorin escapes from the last vessel. This gas is introduced from below into a cylinder at all parts equally fed from above with an aqueous solution of stannic chlorid containing stannous chlorid, the escaping gas thereby becoming totally odorless.

The contents of the first solution vessel being sufficiently increased, i. e., the weight being perhaps nearly trebled, the mixture of chlorin and stannic chlorid is introduced into a closed iron cylinder $m$. The chlorin begins eagerly to escape at once, provided that the cylinder $m$ is not cooled artificially. This escaping of the chlorin can be considerably increased by heating.

In order to liquefy the chlorin it is conducted into a cooled closed receptacle $n$ preferably maintained at a temperature of $-10$ to $-15$ degrees C., whereby the chlorin is liquefied at a pressure of about 2 atmospheres above atmospheric pressure.

What we claim is:

1. A process of separating and concentrating chlorin from gaseous mixtures containing chlorin, which consists in first cooling said gaseous mixture and reducing the vapor pressure of the contained chlorin to a low point, and then subjecting the mixture while in that condition to the action of a flu chlorid compound capable of dissolving chlorin.

2. A process of separating and concentrating chlorin from gaseous mixtures containing chlorin, which consists in first cooling said gaseous mixture and reducing the vapor pressure of the contained chlorin to a low point, and then leading said mixture while in that condition into a liquid chlorid compound of low temperature capable of dissolving chlorin.

3. A process of separating and concentrating chlorin from gaseous mixtures containing chlorin, which consists in first cooling said gaseous mixture and reducing the vapor pressure of the contained chlorin to a low point, subjecting the mixture while in that condition to the action of a fluid chlorid compound capable of dissolving chlorin, and increasing the vapor pressure of the dissolved chlorin to separate it from said chlorid compound.

4. A process of separating and concentrating chlorin from gaseous mixtures containing chlorin, which consists in first cooling said gaseous mixture and reducing the vapor pressure of the contained chlorin to a low point, subjecting the mixture while in that condition to the action of a fluid chlorid compound capable of dissolving chlorin, and raising the temperature of the dissolved chlorin to increase its vapor pressure and separate it from said chlorid compound.

5. A process of separating and concentrating chlorin from gaseous mixtures containing chlorin, which consists in first cooling said gaseous mixture and reducing the vapor pressure of the contained chlorin to a low point, subjecting the mixture while in that condition to the action of a fluid chlorid compound capable of dissolving chlorin, and raising the temperature of and reducing the pressure on the dissolved chlorin to increase its vapor pressure and separate it from said chlorid compound.

6. A process of separating and concentrating chlorin from gaseous mixtures containing chlorin, which consists in first cooling said gaseous mixture and reducing the vapor pressure of the contained chlorin to a low point, and then subjecting the mixture while in that condition to the action of anhydrous stannic chlorid maintained at a low temperature.

7. A process of separating and concentrating chlorin from gaseous mixtures containing chlorin, which consists in first cooling said gaseous mixture and reducing the vapor pressure of the contained chlorin to a low point, subjecting the mixture while in that condition to the action of anhydrous stannic chlorid maintained at a low temperature, and increasing the vapor pressure of the dissolved chlorin to separate it from said stannic chlorid.

8. A process of separating and concentrating chlorin from gaseous mixtures containing chlorin, which consists in first cooling said gaseous mixture and reducing the vapor pressure of the contained chlorin to a low point, subjecting the mixture while in that condition to the action of anhydrous stannic chlorid maintained at a low temperature, and raising the temperature of said solution to increase the vapor pressure of its contained chlorin and separate said chlorin from the stannic chlorid.

9. A process of separating and concentrating chlorin from gaseous mixtures containing chlorin, which consists in first cooling said gaseous mixture and reducing the vapor pressure of the contained chlorin to a low point, subjecting the mixture while in that condition to the action of anhydrous stannic chlorid maintained at a low temperature, and raising the temperature of and reducing the pressure on said solution to increase the vapor pressure of its contained chlorin and to separate said chlorin from the stannic chlorid.

10. A process of separating and concentrating chlorin from gaseous mixtures containing chlorin, which consists in first cooling said gaseous mixture and reducing the vapor pressure of the contained chlorin to a low point, and then introducing the mixture into a fluid chlorid compound capable of dissolving chlorin while the mixture and said chlorid compound are at such relative temperatures as to cause the chlorin to begin to liquefy.

11. A process of separating and concentrating chlorin from gaseous mixtures containing chlorin, which consists in first cooling said gaseous mixture and reducing the vapor pressure of the contained chlorin to a low point, and then introducing the mixture into stannic chlorid while the mixture and the stannic chlorid are at such relative temperatures and pressures as to cause the chlorin to begin to liquefy.

12. A process of separating and concentrating chlorin from gaseous mixtures containing chlorin, which consists in first cooling said gaseous mixture and reducing the vapor pressure of the contained chlorin to a low point, subjecting said mixture while in that condition to the action of a liquid chlorid compound capable of dissolving chlorin, passing the liquid solution through a closed system, heating the solution at one point in said system to separate the chlorin, and cooling the separated chlorin at another point in said system to condense it to the liquid state.

13. A process of separating and concentrating chlorin from gaseous mixtures containing chlorin, which consists in first cooling said gaseous mixture and reducing the vapor pressure of the contained chlorin to a low point, subjecting said mixture while in that condition to the action of stannic chlorid maintained at a low temperature, passing the solution through a closed system, heating the solution at one point in said system to separate the chlorin, and cooling the separated chlorin at another point in said system to condense it to the liquid state.

In testimony whereof we have hereunto set our hands in presence of two subscribing witnesses.

KARL GOLDSCHMIDT.
FRITZ SPITZER.

Witnesses:
PETER LIEBER,
WILHELM FLASCHE.